No. 790,238. PATENTED MAY 16, 1905.
H. M. WILCOX.
METHOD OF RECOVERING COPPER FROM ITS ORES.
APPLICATION FILED MAR. 6, 1905.
2 SHEETS—SHEET 1.
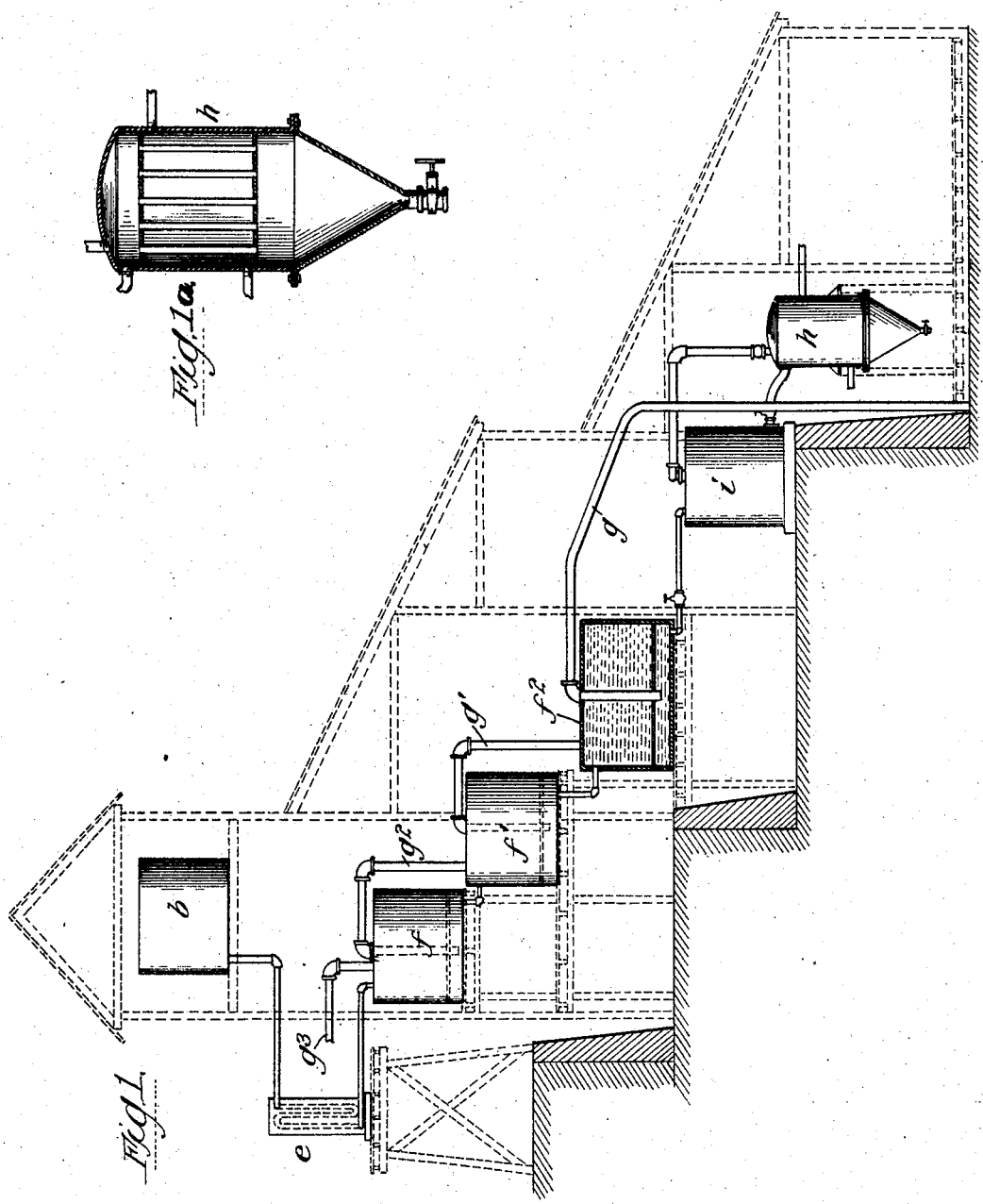
Witnesses:
Inventor:
Henry M. Wilcox
by Peirce & Fisher
Attorney.

No. 790,238. PATENTED MAY 16, 1905.
H. M. WILCOX.
METHOD OF RECOVERING COPPER FROM ITS ORES.
APPLICATION FILED MAR. 6, 1905.
2 SHEETS—SHEET 2.
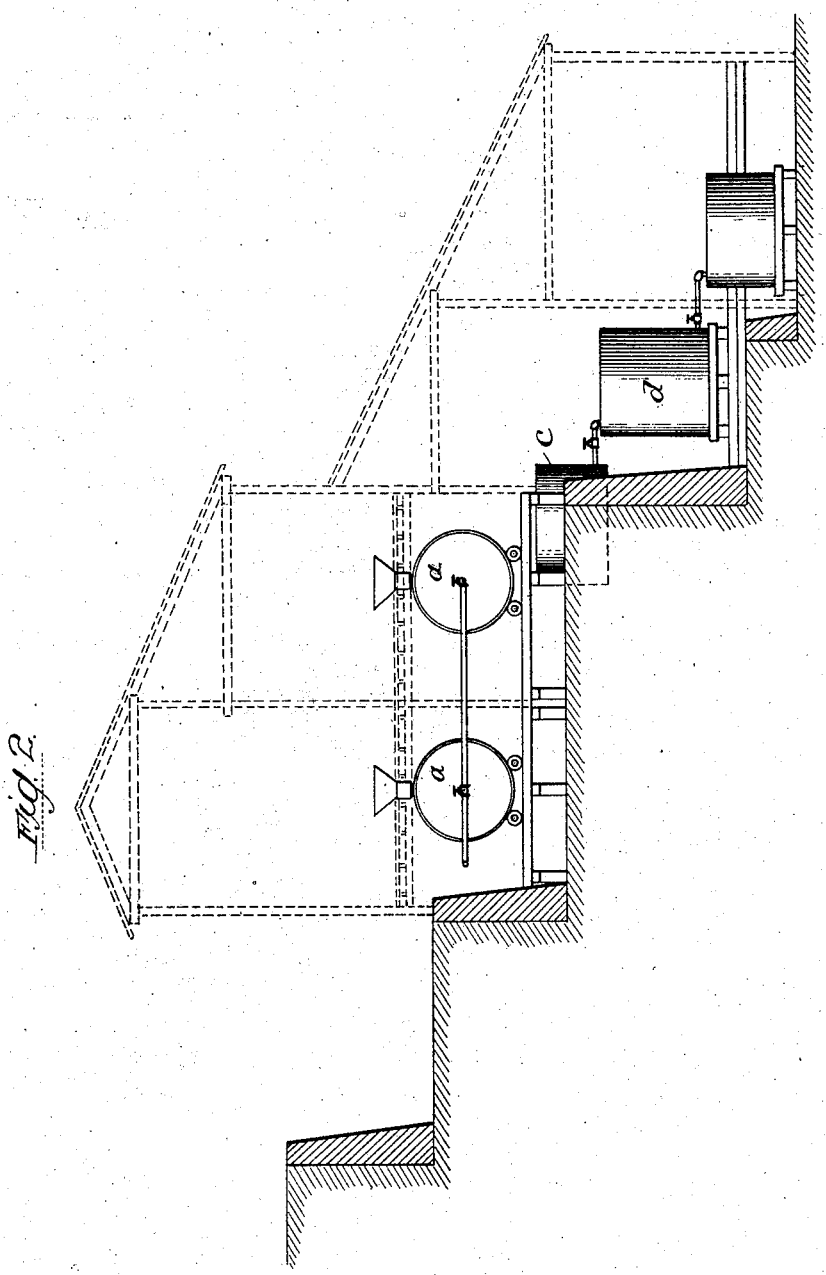

No. 790,238. Patented May 16, 1905.

UNITED STATES PATENT OFFICE.

HENRY M. WILCOX, OF CHICAGO, ILLINOIS, ASSIGNOR TO ESMERALDA COPPER PRECIPITATING COMPANY, OF CHICAGO, ILLINOIS, A CORPORATION.

METHOD OF RECOVERING COPPER FROM ITS ORES.

SPECIFICATION forming part of Letters Patent No. 790,238, dated May 16, 1905.

Application filed March 6, 1905. Serial No. 248,488. REISSUED

*To all whom it may concern:*

Be it known that I, HENRY M. WILCOX, a citizen of the United States, residing at Chicago, in the county of Cook, State of Illinois, have invented certain new and useful Improvements in Methods of Recovering Copper from its Ores, of which the following is hereby declared to be a full, clear, and exact description.

The invention aims to obtain copper from its low-grade ores in metallic state by use of sulfur dioxid acting as a precipitant to throw down the copper under requisite conditions from cupric-sulfate solution, ordinarily constituting the leach liquor, the charge being treated under proper heat and pressure in a close vessel left with certain extent of free space therein suited to cause the copper to separate out practically in pure state with scarcely a trace of its oxid or sulfite present to impair the product.

Heretofore the use of sulfur dioxid as a reagent for recovery of copper from cupric-sulfate solution has been proposed; but the conditions of treatment laid down for the prior practice fail to derive the copper practically pure, the result instead being merely to produce a large amount of copper oxid or sulfite with more or less of granular metal intermixed. The percentage of metal recovered is apt to vary widely for successive charges treated, although in no event is the yield of much moment on comparison with the intermingled oxid or sulfite which goes down at the same time.

Under the new treatment recovery of the copper is had in isolated state nearly if not wholly free from oxid or sulfite, thus for the first time rendering the use of sulfur dioxid an economic precipitant when metallic copper is the product to be obtained.

While the present invention does not depend for its success upon any special form of plant or of precipitating vessel, experience has shown that an apparatus such as illustrated by the drawings that accompany may be used to advantage in dealing with copper carbonate or oxid ores of low grade.

On the drawings, Figure 1 shows a diagrammatic view of the main details of the plant in elevation. Fig. 1ª is a diagrammatic view of the precipitating-boiler in section. Fig. 2 is a like view of the leaching-barrels.

The selected ore having been crushed and ground, as usual, is digested in rotating barrel $a$ with dilute sulfuric acid of about seven per cent. strength until the reaction with the copper in the ore is complete and the solution becomes neutral—say at the end of several hours. Test shows the finished solution to be of about 1.136 specific gravity with some 5.01 per cent. of metallic copper present therein. Any increase in the strength of the acid will correspondingly increase the content of copper; but the point of saturation for the cupric-sulfate solution is soon attained, when the metallic copper present ranges, say, at about seven per cent., (7 %.) Regard being had to the lower reach of temperature to ensue in course of treatment later on, it is obviously useless to saturate the cupric solution only to lose again the excess salts when the solution cools down or chills. Hence the acid strength may for economy be fairly fixed at about seven per cent, (7 %,) as already stated. The specific gravity of the solution varies somewhat in keeping with the quantity of refuse salts, such as iron or the like. After leaching is over the resultant cupric-sulfate solution in hot state is drawn from barrel $a$ into the elevated settling-tank $b$, while the refuse ore removed from barrel $a$ is washed in tank $c$ to recover the remnant of sulfate solution. Having run the dilute wash liquor into neutralizing-tank $d$ for reuse, the refuse ore is taken out of tank $c$ and cast away upon the dump. The hot solution of cupric sulfate present in settling-tank $b$ may be treated there by air-blast to throw down any excess of iron salts or other impurities if present in quantity— say five per cent. or over—sufficient to prove a nuisance later on. Should the iron or other impurities be present only in minor quantity, they can be ignored. After the precipitates settle away the clear solution of cupric sulfate is allowed to run from tank *b*, through cooler *e*, into the topmost absorption-vat *f*.

Cooler *e* may be a simple pipe rebent in series form and submerged in the water vessel. Absorption-vat *f*, like the others of the set— viz., $f'$ $f^2$—is closed at top, but near the base is furnished with a perforated false bottom to sustain a charge of crushed copper ore, ordinarily such as the solution itself comes from. At bottom the companion vats $f$ $f'$ $f^2$ are united by suitable pipes, through which the solution of cupric sulfate is tapped off and descends from vat to vat at intervals, say, of about every two hours. The ore found in such vat acts to take up any free acid, so that the sulfate solution is kept neutral while absorption by it of the sulfur-dioxid gas proceeds. A sufficient supply of sulfur dioxid can be had by burning sulfur or sulfid ore in some suitable furnace, from which the evolved gases are drawn by aid of an exhaust-pump, with cooling-coil between to chill the gases before passing through the pump. After leaving the pump the gas is delivered by pipe *g* directly into the lower absorption-vat $f^2$ at a point beneath the false bottom thereof. The dioxid gas bubbles up through the charge and passes on from vat to vat by pipes $g'$ $g^2$ until it is completely absorbed, the associated nitrogen finally emerging through exit $g^3$ at vat *f* to the air.

The cupric-sulfate solution greedily dissolves the dioxid gas passing through it, so that the charge in lower vat $f^2$ after an hour or so becomes completely saturated. It can contain no more and is at once drawn off into storage-tank *i* in readiness for precipitation treatment. The absorption of the dioxid gas is attended by a marked decline in temperature, which must result in turn in fouling the vats and connecting-pipes with a deposit of cupric sulfate passing out of solution if in excess at the low degree of heat.

The charge of cupric sulfate saturated with sulfur dioxid stands at about 60° Fahrenheit and is found to contain: copper, 4.78 per cent.; combined sulfuric acid, 7.22 per cent., and sulfur dioxid, 2.89 per cent., with a specific gravity 1.147 for the solution. The charge passes from storage-tank *i* into the precipitating vessel *h*, which is made in any convenient form, here shown as a simple upright flue-boiler with the liquid circulating in its flues *k*, while the steam for heating the charge surrounds the flues between the boiler-head plates *l*.

According to practice distinctive of the invention, care must be taken not to overfill the boiler with the charge. Speaking roughly, a space representing about one-tenth of the total content of vessel *i* must be left vacant. When reaction occurs at high heat, the sulfur dioxid is energetically driven off in gaseous state. Space ample enough to freely receive the gas must be left within the vessel, so that although still held the sulfur dioxid is no longer detained in the body of liquid to impair the success of the reaction.

Were the tank filled practically full, experience shows that the copper goes down largely as an oxid or sulfite, and it is only by providing ample space beforehand for free exit of the sulfur dioxid from the body of liquid at the critical reaction stage, lasting but a minute or so, that the copper is obtained in metallic state with scarcely a trace of oxid or sulfite present.

Having filled the boiler to the desired extent, the charge is simply heated in the closed vessel until it attains a proper temperature— *e. g.*, 233° Fahrenheit—at which juncture it is under about one hundred and five pounds pressure. The reaction proceeds quickly with marked energy, the copper separating out and accumulating at the bottom, while the sulfur dioxid passes off into the confined space at top.

Once the reaction is finished a suitable cock is opened at top to release the sulfur dioxid, which can be led away to some storage-receptacle for reuse. After the gas is vented it is simply requisite to draw off the spent liquor and thereafter remove and wash the copper precipitate preliminary to casting it into ingot form for the market.

In practice metallic copper representing 44.81 per cent. of the total copper present in solution has been obtained, showing 99.7 per cent. pure, while the spent liquor remains still rich in copper, analysis of the solution at specific gravity 1.143 disclosing copper, 2.87 per cent.; combined sulfuric acid, 4.40 per cent.; free sulfuric acid, 9.60 per cent., with specific gravity 1.143 for the liquid.

The spent solution can be returned to neutralizing-tank *c* and be dosed there with quicklime or like reagent sufficient in quantity to reduce the percentage of free sulfuric acid, if found necessary. The clear liquor passes into rotating barrel *a*, as desired, to become the solvent for another batch of ground ore. Instead of neutralizing the spent solution a part of it can be diluted with water to reduce the percentage of free sulfuric acid, so as to render it fit for the leach liquor, while the remaining part is evaporated in open vats for recovery of the crystallized salts of copper.

While the ordinary practice contemplates the use of dilute sulfuric acid for the leaching agent, it is entirely feasible to employ sulfur dioxid in its place, this being introduced into the revolving barrel *a* in liquid or gaseous form until the water present with the crushed ore is fully saturated.

The sulfur dioxid attacks the copper, iron, &c., present in the ore and may need to be replenished by further supply as the reaction proceeds. After leaving the barrel or even while there a minor percentage of sulfuric acid can be added to advantage sufficient to avert any premature deposit of copper oxid that might otherwise occur once the sulfur dioxid in solution should become deficient in quantity requisite to hold the copper in solution.

Owing to the heat of reaction the sulfite-sulfate solution of copper on withdrawal from barrel *a* should be chilled down, as before, by aid of cooler *e* after leaving the settling and purifying tank *b* in passage direct to storage-tank *i*. Slight additions of sulfuric acid may occur at both tanks should the sulfur dioxid prove insufficient to stop premature deposit of the copper in oxid state. According to the modified practice the copper solution is not required to pass through absorption-vats *f*, *f'*, and *f²*, since the sulfur dioxid has already been introduced at the outset as a dissolving agent.

By either procedure copper sulfate is found present in solution associated with practically a saturated solution of sulfur dioxid in readiness for treatment under heat and pressure at the precipitating vessel *h*, having suitable space left therein for confined escape of the sulfur dioxid, while the copper separates in metallic form during the reaction. Either plan of leaching the ore falls equally within the scope of the claims presently set forth.

The proportions, degrees of heat, percentages, and the like heretofore stated are given for sake of illustration only in keeping with familiar practice and are not to be taken as exclusive. Variations therefrom may occur according to the knowledge of persons skilled in the art without essential departure from the scope of the invention.

Having thus described my invention, what I claim as new, and desire to secure by Letters Patent, is—

1. The process of recovering copper from its ores by the wet way, which consists in leaching the ore with suitable reagent to form cupric-sulfate solution, dosing the solution with sulfur dioxid, and thereafter, in a closed vessel having proper vacant space left therein, subjecting said solution to heat and pressure, suited for precipitation of the copper in metallic form while the sulfur dioxid is free to escape from the liquid into the confined space in such vessel provided, to perfect the reaction, substantially as described.

2. The process of recovering copper from its ores by the wet way, which consists in leaching the ore with suitable reagent to form cupric-sulfate solution, blowing air through the hot solution to remove iron or other impurities, dosing the solution with sulfur dioxid, practically to the point of saturation, and thereafter, in a closed vessel having proper vacant space left therein, subjecting said solution to heat and pressure, suited for precipitation of the copper in metallic form while the sulfur dioxid is free to escape from the liquid into the confined space in such vessel provided, to perfect the reaction, substantially as described.

HENRY M. WILCOX.

Witnesses:
RICHARD H. SALTER,
JOSEPH G. SPENCER.